United States Patent
Fanning et al.

(10) Patent No.: US 12,225,002 B2
(45) Date of Patent: Feb. 11, 2025

(54) ENRICHING EXPOSED CREDENTIAL SEARCH RESULTS TO MAKE THEM ACTIONABLE

(71) Applicant: Microsoft Technology Licensing, LLC, Redmond, WA (US)

(72) Inventors: Michael Christopher Fanning, Redmond, WA (US); Suvam Mukherjee, Allston, MA (US); Jacek Andrzej Czerwonka, Sammamish, WA (US); Christopher Michael Henry Faucon, Redmond, WA (US); Eddy Toshiyuki Okada Nakamura, Redmond, WA (US); Danielle Nicole Gonzalez, LeRoy, NY (US); Nicolas Yves Couraud, Westwood, MA (US); Alison Lynne Maclellan, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 17/967,113

(22) Filed: Oct. 17, 2022

(65) Prior Publication Data
US 2024/0129293 A1 Apr. 18, 2024

(51) Int. Cl.
*G06F 21/00* (2013.01)
*H04L 9/40* (2022.01)

(52) U.S. Cl.
CPC .................................. *H04L 63/083* (2013.01)

(58) Field of Classification Search
CPC . H04L 63/083; G06F 21/554; G06F 21/6245; G06F 21/577
See application file for complete search history.

(56) References Cited

U.S. PATENT DOCUMENTS

| | | | |
|---|---|---|---|
| 8,621,441 B2 | 12/2013 | Landwehr et al. | |
| 8,726,392 B1 | 5/2014 | Mccorkendale et al. | |
| 9,465,942 B1 | 10/2016 | Kane-Parry | |
| 10,025,699 B2 | 7/2018 | Muske | |
| 10,097,574 B2 | 10/2018 | Tripp et al. | |
| 10,440,050 B1 * | 10/2019 | Neel | H04L 63/145 |
| 10,860,312 B1 | 12/2020 | Elwell et al. | |
| 11,223,636 B1 * | 1/2022 | Angara | H04L 9/3247 |
| 11,288,376 B2 | 3/2022 | Tsai et al. | |

(Continued)

OTHER PUBLICATIONS

U.S. Appl. No. 16/932,415, filed Jul. 17, 2020.

(Continued)

*Primary Examiner* — William A Corum, Jr.
(74) *Attorney, Agent, or Firm* — Workman Nydegger

(57) ABSTRACT

Techniques for (i) using contextual information associated with an exposed credential to identify a resource that could be accessed using the exposed credential, (ii) identifying a responsible entity of that resource, and (iii) alerting the responsible entity about the exposed credential are disclosed. A credential is determined to be in an exposed state. The exposed credential, if used, could potentially provide an actor access to a resource, despite the fact that the actor should not have access to the resource. The exposed credential is analyzed to determine a context. Based on that context, the resource is identified. A responsible entity associated with the resource is identified. An alert is then sent to that entity.

17 Claims, 11 Drawing Sheets

(56) References Cited

U.S. PATENT DOCUMENTS

| | | | |
|---|---|---|---|
| 2017/0123964 A1 | 5/2017 | Strosaker | |
| 2017/0346797 A1* | 11/2017 | Yedidi | H04L 63/14 |
| 2019/0007428 A1* | 1/2019 | Moen | H04L 67/02 |
| 2019/0207771 A1* | 7/2019 | Hecht | H04L 63/1408 |
| 2020/0137096 A1 | 4/2020 | Endler | |
| 2020/0137105 A1 | 4/2020 | Endler | |
| 2020/0349259 A1* | 11/2020 | Tsai | G06F 21/562 |
| 2023/0385451 A1* | 11/2023 | Lockhart, III | G06F 21/6245 |
| 2024/0126917 A1* | 4/2024 | Fanning | G06F 21/64 |

OTHER PUBLICATIONS

U.S. Appl. No. 17/340,455, filed Jun. 7, 2021.
U.S. Appl. No. 17/941,859, filed Sep. 9, 2022.
Feng et al., "Automated detection of password leakage from public GitHub repositories", Proceedings of the 34th ACM Symposium on Parallelism in Algorithms and Architectures, ACMPUB27, USA, May 21, 2022, pp. 175-186, XP059163221.
International Search Report and Written Opinion received for PCT Application No. PCT/US2023/031803 (MS# 412255-PCT01), mailed on Dec. 5, 2023, 13 pages.
Ostrand, et al., "Using Static Analysis to Determine Where to Focus Dynamic Testing Effort", In Proceedings of Second International Workshop on Dynamic Analysis, co-located with the 26th International Conference on Software Engineering, ICSE, May 25, 2004, 8 Pages.
Tahaei, et al., "Security Notifications in Static Analysis Tools: Developers' Attitudes, Comprehension, and Ability to Act on Them", In Proceedings of the CHI Conference on Human Factors in Computing Systems, May 8, 2021, 17 Pages.

* cited by examiner

ENRICHING EXPOSED CREDENTIAL SEARCH RESULTS TO MAKE THEM ACTIONABLE

BACKGROUND

Plaintext secrets (e.g., unencrypted secrets) present a serious source of security risk for the data storage industry as well as other industries. In some cases, plaintext secrets can be overlooked by scan tools (e.g., static analysis scanning tools). In cases where exposed secrets are detected, there are significant complications in remediating these exposures. Such complications include scenarios where supposed secrets end up being false positives. Another complication involves detecting secrets that are expired or that belong to deleted resources. If a secret is expired or belongs to deleted resources, then remediation is not needed, and if performed, is a wasted effort. Another complication is that it may be difficult to determine what entity allocated the secret so that the entity can be contacted to provide a security response. It may also be difficult to determine the full set of actors who use a specific secret and who will therefore be disrupted if a secret is invalidated or rotated without coordinating with them.

"Bearer token" systems are a particular source of risk. A "bearer token" is a type of plaintext secret that is a quasi-password. This quasi-password, on its own, can be used to complete an authentication flow (e.g., "please provide access to the bearer of this secret"). Bearer tokens are performant in providing authorization for resources and are broadly used throughout the industry. Because there is no identity-specific validation (e.g., no expensive cryptographic signing), this security model can be very convenient. The storage, retrieval, and transmission of these types of secrets, however, should still be handled in a secure way.

There is a trend in the industry to move away from bearer tokens in favor of exclusively identity-driven solutions, such as role-based access control (RBAC) and managed service identities (MSI). These approaches sidestep many risks associated with bearer tokens but can come at greater costs, both in terms of creating and managing identities and in converting existing systems to move off the bearer token approach.

That being said, some data storage customers have expressed an unwillingness to move away from bearer tokens, even in cases when RBAC/MSI-driven alternatives exist to provide authentication. This unwillingness is often due to the lack of convenience with such systems and due to presumed development inefficiencies.

Unfortunately, developers sometimes inadvertently expose secrets/credentials. In fact, it is inevitable that some secrets/credentials (e.g., bearer tokens, passwords, usernames, etc.) will be committed to source code, a document, or some other data structure (collectively referred to as "artifacts"). That artifact might then be egressed to a public repository or other Internet location, thereby providing a risk for a security breach in which an unauthorized entity gains access to the secret and then uses that secret to gain access to a resource.

Exposed secrets/credentials have been a challenge for data storage and other service providers for a very long time. For instance, thousands of valid application secrets are found in commonly used repositories each month. Sometimes, customers are not aware of this exposure. When a secret is found, it is often difficult to determine who should be notified regarding this exposed secret. What is needed, therefore, is an improved technique for determining who should be notified when a scenario involving an exposed credential occurs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for (i) using contextual information associated with an exposed credential to identify a resource that could be accessed using the exposed credential, (ii) identifying a responsible entity of that resource, and (iii) alerting the responsible entity about the exposed credential.

Some embodiments identify a credential that is located within an artifact. The embodiments determine that the credential is in an exposed state. As a result, the credential is an "exposed" credential. The exposed credential, if used, could potentially provide access to a resource. The embodiments analyze the exposed credential and/or the artifact to determine a "context" for the exposed credential. Based on that context, a particular resource is identified. The embodiments then determine a responsible entity for the resource. The embodiments also trigger transmission of an alert. The alert includes information detailing circumstances surrounding the exposed credential.

To identify the responsible entity, some embodiments identify a subscription mapping associated with the resource. In such embodiments, the subscription mapping includes a subscription identification for an entity associated with the resource. Based on the subscription identification, the embodiments identify the responsible entity.

Some embodiments identify a first credential that is located within a first artifact. A determination is made that the first credential is in an exposed state. If used, the first exposed credential could potentially provide access to a resource. The embodiments analyze the first exposed credential and/or the first artifact to determine a context. Based on the context, the resource is identified. The embodiments also determine a responsible entity for the resource. The embodiments then trigger transmission of an alert to the responsible entity. The alert includes information detailing how the first exposed credential is in the exposed state. Additionally, the embodiments determine a first characteristic of the first exposed credential. A relationship between the first characteristic of the first exposed credential and the resource is established. The embodiments store an indication of this relationship in a data source. Beneficially, the indication is searchable. The embodiments identify a second exposed credential having a second characteristic, which is similar to the first characteristic. Based on this similarity, an inference is generated, where this inference indicates that the second exposed credential is also likely associated with the resource.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
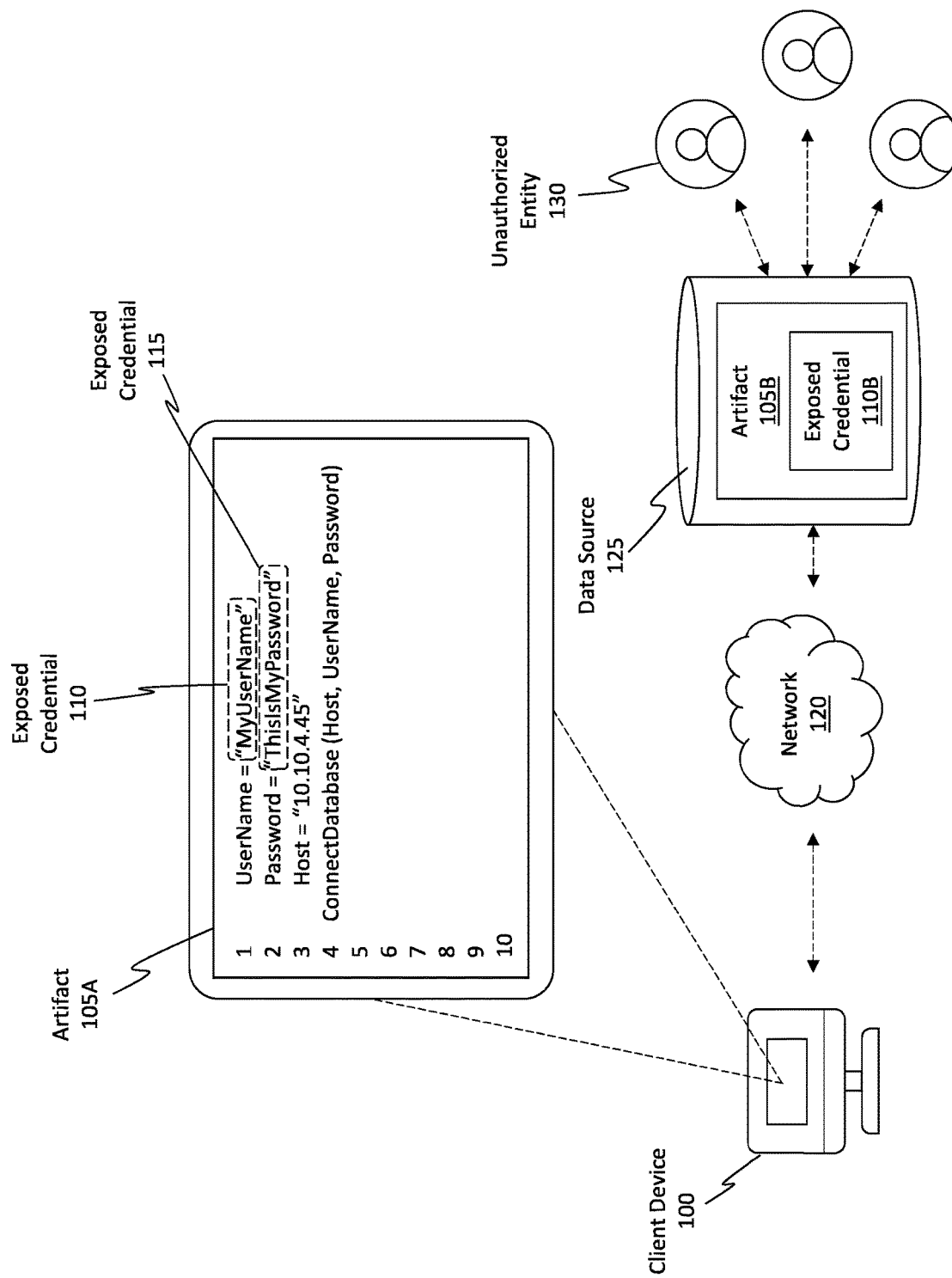
FIG. 1 illustrates an example scenario where a credential is in an exposed state.

Embodiments disclosed herein relate to systems, devices, and methods for (i) using contextual information associated with an exposed credential to identify a resource that could be accessed using the exposed credential, (ii) identifying a responsible entity (e.g., one or more entities with permissions for managing the resource) of that resource, and (iii) alerting the responsible entity about the exposed credential.

Some embodiments determine that a credential is in an exposed state. The exposed credential, if used, could potentially provide an actor access to a resource, despite the fact that the actor should not have access to the resource. The embodiments analyze the exposed credential and/or an artifact comprising the exposed credential to determine a context. Based on that context, the resource is identified. The embodiments then determine a responsible entity associated with the resource. The embodiments also trigger transmission of an alert. The alert includes information detailing how the exposed credential is in the exposed state.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about substantial benefits, advantages, and practical applications to the technical field of data security management. Beneficially, the disclosed embodiments improve data security by providing techniques and mechanisms for quickly and efficiently identifying a responsible entity who likely has an interest in being notified regarding an exposed credential. Performing the disclosed operations reduces the likelihood of security breaches.

The disclosed embodiments also help prevent possible security breaches by automating some of the remediation steps (e.g., the identification of the responsible entity) that are performed when a secret is exposed, whether those secrets are client secrets, application secrets, or perhaps even developer secrets. The embodiments effectively create an automation routine that identifies a responsible entity for a workload identity. That is, with regard to the general process flow of identifying the responsible entity, the disclosed service attempts to remove or eliminate the need for human involvement. In doing so, the service significantly decreases the amount of time that is needed to initiate the steps that are performed to remedy the mistake or leakage.

The embodiments beneficially describe a solution that addresses all of the concerns and complications mentioned earlier. At a high-level the disclosed principles include techniques for improving the "identifiability" of credentials (e.g., bearer tokens, passwords, usernames, etc.) to drive false positive and false negative rates in detection to around 0%. The embodiments also provide an automated mechanism for identifying responsible parties of a credential, resource, or artifact. The embodiments also provide an anonymous endpoint that accepts reports of exposure. The disclosed embodiments include a service that can correlate secrets with the resource providers that allocated them.

There are many substantive values in such a system. For instance, the system holds the promise of greatly reducing the literal costs associated with responding to scenarios that involve a leaked or exposed credential and would reduce the window of literal exposure for an exposed secret. The embodiments allow for seamlessly merging of a bearer token model or credential model with an RBAC or MSI-driven approach. In other words, bearer tokens can be allocated and utilized by development teams (e.g., to gain the convenience and efficiencies of this approach) with the advance knowledge that any detection/reporting of these secrets (if they are mishandled) will result in the automatic notification to responsible entities of those secrets.

The embodiments also allow for maximal engagement with the security researcher community. Reporting can be entirely anonymous as the simple fact of having/bearing a secret is sufficient to require identifying a responsible entity. "Identifiable" secrets (e.g., secrets having a known pattern) also eliminate or reduce false negatives and false positives, which ensures that all activity in the system is driven by actual finds.

The disclosed identifiable secrets model additionally allows for routing and risk assessment (using the bearer tokens themselves). Such a model allows for a single reporting endpoint to handle credentials reported for a range of resource providers (e.g., secret allocating security models). As a result, the disclosed solutions eliminate false positives and ensure that no or minimal false negatives (missed detections) occur. Such solutions provide an enormous improvement over many existing scan capabilities today.

The disclosed solutions do not necessitate the management of enormous amounts of metadata to determine the resource provider who allocated the secret, the persons who allocated the secret, or even all users/dependencies that also depend on the secret. The solutions allow for complete anonymity in reporting, thereby allowing the system to leverage (as one example) public security research and reporting to the endpoints (e.g., for secrets that may be detected in public open source repositories).

The disclosed embodiments beneficially glean enough contextual information from a scanning result (e.g., perhaps a static analysis scan) to identify a resource associated with the exposed or leaked credential. Doing so enables the embodiments to make a runtime invocation to validate if the identified credential is a false positive. As a concrete example, if a string is indeed a token/credential, then there is usually enough contextual information in the neighboring code to identify the type of token. The embodiments can then beneficially construct a URL to see if they can access a resource using the token.

The embodiments also enable enriched fingerprinting of findings. The embodiments beneficially construct a unique fingerprint for each credential finding. Additional information can then be added to the fingerprint to optimize subsequent runs of leaked credential searches. For example, if the fingerprint stores an indication of the resource that was accessed using the credential/token, then the embodiments can skip the piggybacked step of gleaning additional context information for dynamic validation. Instead, the embodiments can attempt to validate the credential/token directly based on the resource identified in the fingerprint.

Another advantage is that the embodiments are able to tag ownership information to credential findings. Modern software development uses some form of version control for source code. The embodiments leverage the version control data structures to tag credential findings with ownership information. As an example, after a search identifies a potential token and the dynamic validation step confirms that it is indeed an exposed credential, the embodiments can check who made the last commit to the file and use this as an approximate ownership information for the finding. If there are additional hierarchical data structures pertaining to ownership (e.g., a tree defining the manager of the engineer who made the commit), then those can be leveraged as well.

Accordingly, the embodiments provide improved actionability of credential finding results. The general idea breaks down two important barriers that hinder actionability of results. These barriers include the fact that people do not know if the result they are looking at is a false positive. Manually verifying this adds overhead to the development process, and developers often lose trust in the tool. Another barrier is that people do not know who to reach out to when a search reports a finding. The embodiments beneficially make sure (i) the problems are routed to the right people and (ii) people can trust that the finding they are viewing is a real one. Doing so dramatically improves the actionability of the scanning/search results.

Since there is continuous code churn in every organization, it is typically the case that searches rarely run only one time. Instead, they are typically configured to run at a particular cadence. The idea regarding enriched fingerprints ensures that information from one run optimizes the performance of subsequent runs, thereby resulting in significant savings in computational costs. Accordingly, these and numerous other benefits will now be described in detail throughout the remaining sections of this disclosure.

Example Scenario Involving an Exposed Credential

Having just described a few of the benefits of the disclosed embodiments, attention will now be directed to FIG. 1. FIG. 1 illustrates an example scenario involving the use of a client device 100. In this example, the client device 100 belongs to a code developer who is developing source code, which is a type of engineering artifact, or simply artifact 105A.

Figure 2:
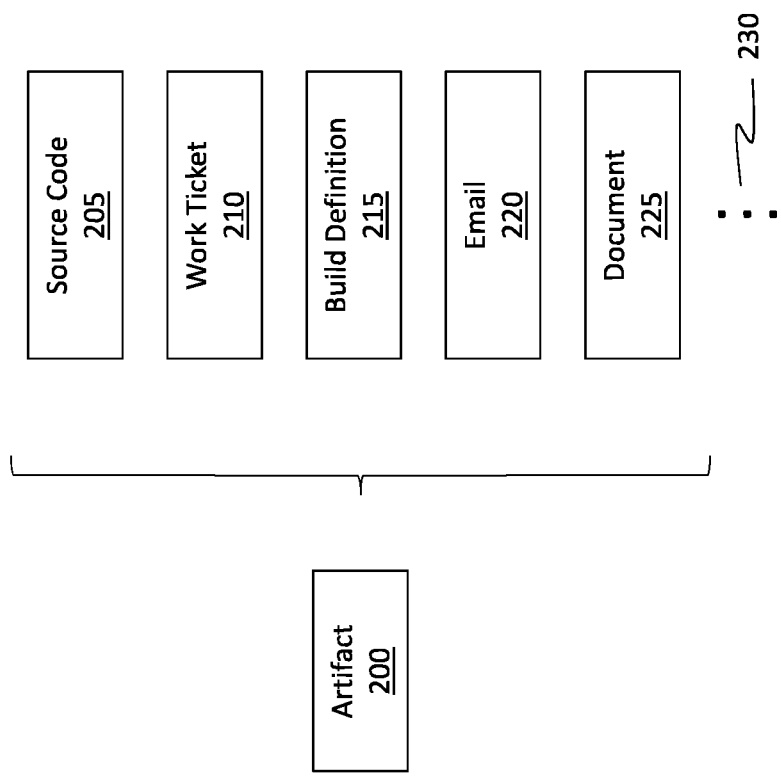
FIG. 2 illustrates various different implementations of an example artifact.

Turning briefly to FIG. 2, this figure illustrates various other examples of an artifact 200, which is representative of the artifact 105A from FIG. 1. Artifact 200 can take various forms. These forms include, but are not limited to, any type of source code 205, work ticket 210, build definition 215, email 220, or even a document 225. The ellipsis 230 illustrates how other data structures can be included in the artifact 200. For instance, the data structures can include other data structures associated with the build definition, such as perhaps an automation artifact comprising (i) an automation script, descriptor, or other artifact that configures or otherwise drives automation behavior and (ii) an automation output comprising a log or compilation output. The data structures can also include a workflow artifact. The data structures can include any type of source controlled artifact, which can include the source code 205 or any other artifact that is included in a data source.

Figure 3:
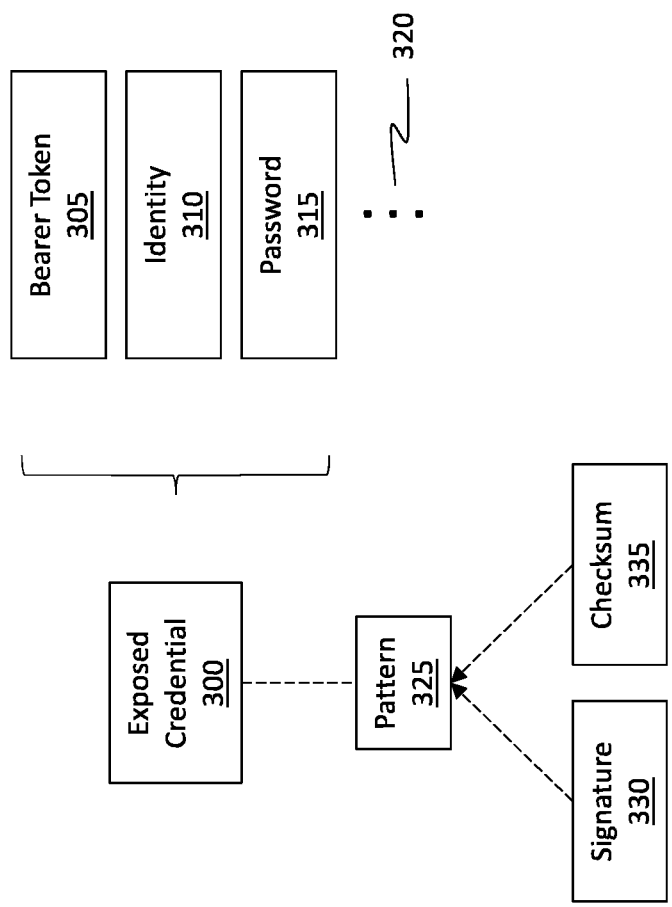
FIG. 3 illustrates various different implementations of an example credential.

Returning to FIG. 1, the artifact 105A is shown as being in the form of source code. Embedded within this source code are at least two exposed credentials, as shown by exposed credential 110 and exposed credential 115. The exposed credential 110 (aka secret) is shown as being a username, and the exposed credential 115 is shown as being a password. FIG. 3 provides some additional details regarding various different types of exposed credentials.

FIG. 3 shows an exposed credential 300, which is representative of any of the exposed credentials in FIG. 1. In various embodiments, the exposed credential 300 can be in the form of a bearer token 305, an identity 310 (e.g., a username, a GUID, a sensitive identifier signifier, or some other name), or a password 315. The ellipsis 320 demonstrates how other data structures can be designated as an exposed credential 300. For instance, the exposed credential can be a certificate (e.g., an allocated bundle of data that is allocated by an authority), a private key (e.g., a mathematically static value used for cryptographic purposes), a static credential store (e.g., a bundle of credentials that are persisted to file, such as perhaps an archived copy of passwords or perhaps a checked-in set of credentials), a container of multiple artifacts, or even compressed data. As some additional examples, it may be the case that a computer port is an exposed credential, an Internet Protocol (IP) address is an exposed credential, any type of token can be an exposed credential, and so on.

In some implementations, the embodiments are able to recognize a data structure as being a credential based on a detected pattern 325 of that data structure. For instance, the embodiments are able to cause a credential to include an embedded signature 330. Some credentials can include an embedded or associated checksum 335. The embodiments are able to scan and analyze a data source (e.g., a persistent artifact store or a persistent data store), which potentially includes a credential, to detect the credential based on its pattern. If the pattern matches a known pattern that is linked or associated with patterns that are known to belong to credentials, then the embodiments can determine that this data structure is a credential. Accordingly, the pattern can optionally be based on one or a combination of the signature 330 and/or the checksum 335. In some implementations, a credential can take a variety of forms. For instance, the credential can be formatted as a 256-bit base64-encoded string.

Regarding the signature 330, a fixed signature, sometimes referred to as a "magic value" can be used. This fixed signature can be a constant numeric or textual value that is persisted to a well-known position within a data stream to denote its format. This mechanism can be used to efficiently eliminate a significant percentage of false positives via regex matching. Such a practice is beneficial because constant values can be expressed in the token/credential itself. If thoughtfully designed, this process can allow for 100% recall (i.e. 100% true positive retrieval) via simple (regex) pattern-matching. This avoids the costs of performing additional runtime processing.

Regarding the checksum 335, checksums provide a well-known pattern for ensuring data integrity. Secret providers can reserve bytes within a secret to store a computed checksum of the remaining data. Beneficially, individual security providers can uniquely identify their own secrets (e.g., within an otherwise shared format) by XOR'ing checksums with a well-known, stable "magic value." Because checksums are distributed across their full range of values (that is, a 32-bit checksum will distribute all possible inputs across 2^32 possible checksums), this greatly reduces the likelihood of a collision with a different data generator.

In some embodiments, there are 8-10 characters reserved in every generated secret, token, or credential. These characters are reserved to express a fixed signature and a checksum (or partial checksum). Optionally, the secret reserves the final 4-6 characters of the token to persist an encoded checksum of the remainder of the secret. The checksum, when generated, can include the fixed signature in its processing.

Optionally, every resource provider can be tasked with defining a unique checksum seed that appropriately categorizes generated secrets. Generated keys that are provided to customers, for example, can use a different checksum seed than a code path that generates keys for encrypting customer data (which are entirely managed by the resource provider). For base64-encoded secrets, the checksum can be persisted in the final bytes of the decoded secrets. For secrets that are allocated from a custom character set, the checksum can be encoded using that character set and appended to the remainder of the secret.

Distinct seeds/secret categories can be versioned simply by incrementing the first allocated seed value (or by incrementing a numeric value in a string literal used to generate the seed). The secret can include a four-character fixed signature that is persisted immediately before the checksum.

In addition to or as an alternative to the signature and checksum, other techniques can be used to provide a detectable pattern for a credential. For instance, a "hashcash" can be used. A hashcash is a proof-of-work algorithm that entails completing sufficient computation to generate data that, when hashed, conforms to a highly recognizable pattern (e.g., such as by having a certain number of leading zeros). The technique works by first generating a secret that meets a length or other criteria. Arbitrary data is then appended to the secret until the hash of the candidate data has a recognizable signature (e.g., such as three leading zeros in the hash value). Once the right additional data (e.g., a "nonce") is found, all of it (e.g., the original secret plus the nonce that together results in a recognizable signature when hashed) is returned and serves as the secret. This technique provides for easily identified secrets/passwords. A scanner can perform a preliminary detection and can then hash all finds to look for the identifiable pattern in the hash. Detections that do not meet the hash pattern criteria are dropped as false positives. Accordingly, there are various techniques for configuring a secret to have a known pattern.

Returning to FIG. 1, the user of the client device is currently developing source code. In this example, the user has decided to check his/her code into a data source for safe keeping or perhaps for peer review. FIG. 1 shows the scenario where the client device 100 is connected to a network 120 and where the artifact 105B, which is representative of the artifact 105A, is shown as being uploaded or checked into a data source 125. Notice, the artifact 105B is shown as including the exposed credential 110B, which is representative of one of the exposed credentials 110 or 115.

In this scenario, the data source 125 is a publicly accessible data source. Notice, an unauthorized entity 130 is shown as now having access to the exposed credential 110B. If this exposed credential 110B were accessed by the unauthorized entity 130, that entity could then potentially use the credential to access a resource that the entity would not otherwise be permitted to access. A "resource" can be any type of resource. Examples of resources include, but are not limited to, an application, service, executable, or any other type of data structure that uses or relies on credential information.

Accordingly, FIG. 1 shows an example scenario that could potentially lead to a security breach. The disclosed embodiments are beneficially tailored to remediate such a scenario and to prevent the potential for security breaches.

Example Architectures

Figure 4A:
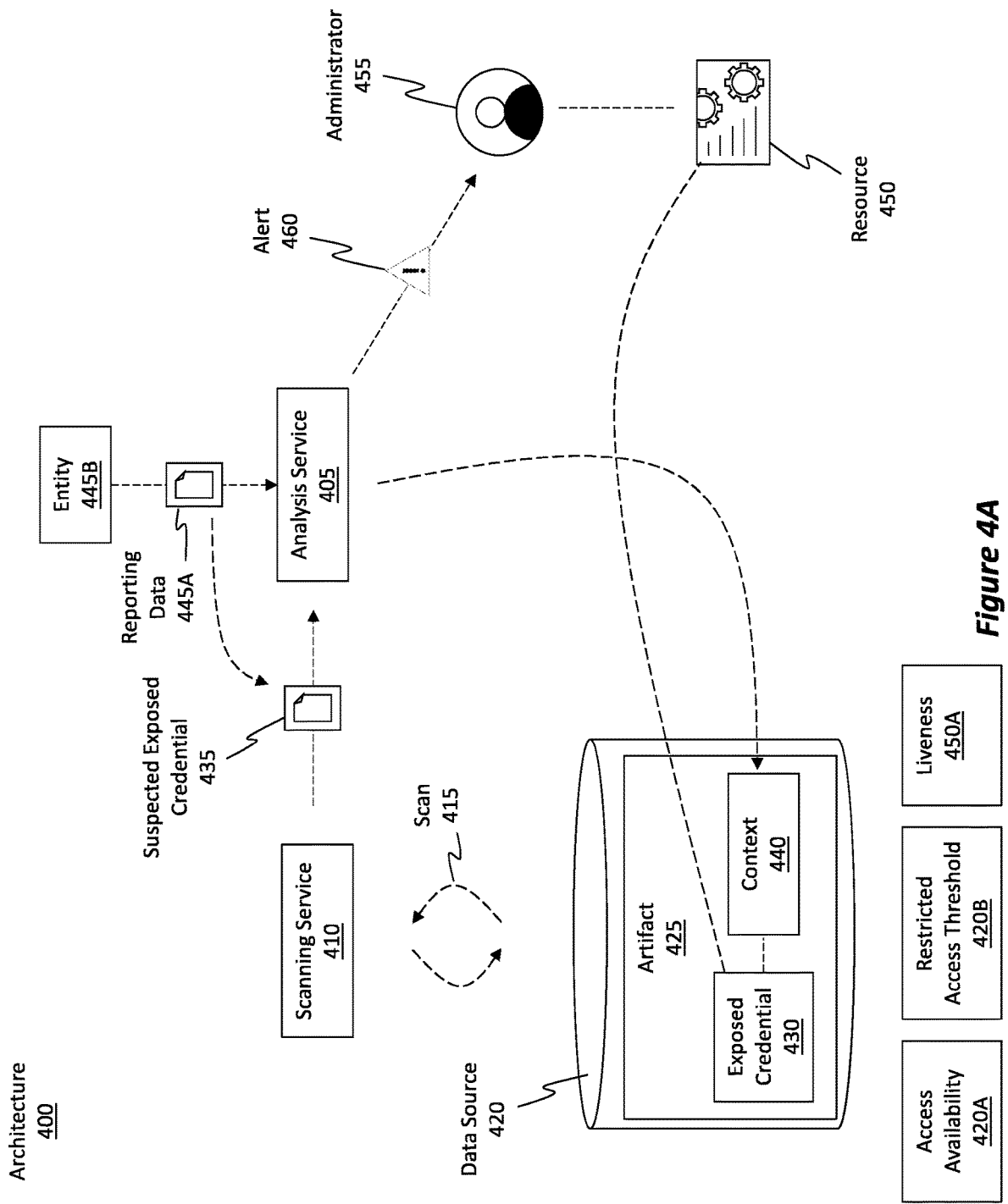
FIGS. 4A, 4B, 4C, and 4D illustrate an example architecture that can be used to determine a responsible entity associated with an exposed credential.

Attention will now be directed to FIG. 4A, which illustrates an example architecture 400 that can be used to identify a responsible entity that is associated with an exposed credential. Architecture 400 is shown as including an analysis service 405.

In various embodiments, the analysis service 405 is a cloud service operating in a cloud environment. In other embodiments, the analysis service 405 is a local service that is operating on a local device. In yet other embodiments, the analysis service 405 is a hybrid service that can operate in both the cloud and on a local device.

In some cases, the analysis service 405 is or includes a machine learning engine. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The analysis service 405 operates in conjunction with a scanning service 410. In some implementations, the scanning service 410 is an integrated part of the analysis service 405. In other implementations, the scanning service 410 is distinct relative to the analysis service 405. Optionally, the scanning service 410 can even be a third-party service.

In any event, the scanning service 410 is tasked with scanning (e.g., as shown by scan 415) a data source 420 or any data stream. The data source 420 can be any type of data source. In some instances, the data source is a controlled data source that restricts access to only authorized individuals having a threshold level of security authorization. In some implementations, the data source 420 is a publicly accessible data source that has no or minimum security requirements to access the data source 420. In some cases, the data source 420 is controlled by an enterprise, yet it is still generally accessible by entities associated with the enterprise. In any event, the data source 420 is one whose access availability 420A (e.g., options that enable entities to access the data source 420) does not satisfy a restricted access threshold 420B with regard to the credential and/or resource. What this generally means is that the content uploaded or checked into the data source should be (but sometimes is not) content that would not present a possibility for a potential security breach by unauthorized entities. As mentioned previously, however, that is not always the case. Stated differently, it may be the case that confidential credential information has been inadvertently uploaded into the data source 420, and entities who do not have sufficient authorization to access a resource can otherwise access it because they can now access that resource's credential via the data source 420.

In FIG. 4A, an artifact 425 (e.g., any of the artifacts 200 of FIG. 2) has been uploaded or checked into the data source 420. In this example, the artifact 425 is shown as comprising an exposed credential 430, similar to the scenario that was described in FIG. 1.

In accordance with the disclosed principles, the embodiments are able to scan the data source 420 and detect the exposed credential 430. Machine learning can be performed to detect the credential 430. In some cases, the credential 430 can be detected based on its detected pattern, as mentioned previously.

The analysis service 405 obtains or accesses the now-suspected possibly-exposed credential 435, which is representative of the exposed credential 430. Optionally, instead of obtaining the actual credential, the analysis service 405 obtains information describing the credential. Such information can include the specific location where the exposed credential 430 is located, such as its memory position or perhaps its location within the artifact 425.

In some implementations, additional or alternative reporting data 445A can be provided to the analysis service 405. For instance, a separate entity 445B (e.g., perhaps external third-party services) or perhaps even humans can detect the presence of an exposed credential in a data source. The separate entity 445B can be an anonymous endpoint, a trusted entity, or even an internal enterprise entity. These entities can report their findings in the form of the reporting data 445A and can provide that reporting data 445A to the analysis service 405. Thus, in some scenarios, the scanning service 410 detects the presence of the exposed credential 430 and provides it to the analysis service 405 while in other scenarios, the exposed credential 430 is detected by some other entity and reported to the analysis service 405 in the form of reporting data 445A. As such, the exposed credential 430 can be reported even by anonymous entities.

Receipt of the reporting data 445A can trigger the embodiments to perform a verification on the reporting data 445A in an attempt to reduce or eliminate a false positive with regard to identifying an exposed credential. In some instances, receiving the reporting data 445A can trigger the scanning service 410 to scan and analyze whatever data source is identified by the reporting data 445A in an attempt not only to identify a potential exposed credential (as identified in the reporting data 445A) but also to potentially identify other potentially exposed credentials in the data source. Receiving the reporting data 445A can thus trigger the identification of the suspected exposed credential 435, which might be identified via other techniques beyond that of the scanning service 410 (e.g., it might be identified via the reporting data 445A).

In response to accessing the reporting data, the embodiments can perform one or more various actions. For instance, the embodiments can filter the reporting data to determine an accuracy associated with the reporting data (e.g., does the reporting data accurately identify an exposed credential or an artifact comprising the exposed credential). In other words, the embodiments can perform an evaluation on the data in an attempt to filter out false positives. Another action includes acquiring one or more artifacts pointed to by the reporting data and subjecting those artifacts for review or scan. In some cases, an artifact comprising the potentially exposed credential can be accessed, downloaded, or otherwise contacted. The embodiments can then trigger an examination of this artifact in an attempt to verify the authenticity of the reporting data.

In addition to accessing the exposed credential 430, the analysis service 405 is further able to obtain a context 440 associated with the exposed credential 430. As used herein, the term "context" can refer to any type of metadata associated with the exposed credential 430, any type of container or data structure that is associated with the exposed credential 430, and/or any other information that is internal to or perhaps external to the exposed credential 430, where that information might provide a clue or indication as to what resource, subscription, or entity is associated with the exposed credential 430. In some cases, the context includes historical information associated with the exposed credential. For instance, the historical information can include a duration that the exposed credential has been in the exposed state. Often, it is less complicated to identify a responsible entity for a newly exposed or recently exposed credential. As the time that a credential is exposed increases, it is often the case that it is more difficult to identify a responsible entity. Providing the historical data can help with identifying the responsible entity and can optionally help to set a priority level for this search.

An example will be helpful. Suppose the artifact 425 is source code, and the source code includes the exposed credential 430, The analysis service 405 is able to scan the source code as well as determine various internal characteristics of the exposed credential 430 in an effort to determine the context 440 for the exposed credential 430. As an example, it may be the case that the source code includes the name of a server that uses the source code; or it may be the case that the source code identifies a particular service that uses the source code; or it may be the case that the source code identifies a subscription. Such information may be useful in identifying what entity is ultimately responsible for the exposed credential. Further, such information can be included in the context 440. Accordingly, the context 440 for the exposed credential 430 can be obtained directly from the exposed credential 430 itself (e.g., such as perhaps embedded metadata in the exposed credential 430) and/or the context 440 can be sourced from documents, files, or other data structures that are external relative to the exposed credential 430 or that perhaps include the exposed credential (e.g., source code that includes the credential).

By way of additional clarification, the context can be determined via a discovery process that involves one or more of the following: an examination of the artifact itself, an examination of a nested set of artifacts that includes the one mentioned above, or even a consultation with a security model. An example of a "nested set of artifacts" is warranted.

One example of a nested set of artifacts can include a database that is included in a zip file that is a part of a storage repository that is managed by a cloud service. These various artifacts may all be reliant on one another. If the database were to include the exposed credential and if the other artifacts were dependent on the database, then the context can be obtained by analyzing not only the database itself but also the other artifacts.

Accordingly, an artifact can optionally be stored in another artifact, such as in a nested condition. The embodiments are able to provide or obtain contextual information about the whole chain of corresponding artifacts. The embodiments are also able to determine responsible entities for each of those various different artifacts. The embodiments can also build routing details to find the most obvious entity to alert.

Additionally, an escalation path for feedback can be generated. If something breaks down with the resource, the embodiments can inform the responsible entity that it should take action.

From this, one can discern how there can be multiple chains of responsibility, where those chains include identifying and alerting entities regarding the source of the exposure and where those chains include identifying and alerting entities regarding the compromised resource itself. If certain entities cannot be located, alert escalation can occur, and entities within the overall organization can be notified.

Building on the previous discussion, in some cases, the context is determined based on one or more of: (i) identifying keywords in other artifacts that are perhaps persisted globally or that are perhaps in a nested relationship with the credential or (ii) identifying a security model of the credential and communicating with an allocator to obtain the context. The embodiments can also attempt to elaborate on what has been provided, such as by estimating or inferring variations of the exposed credential, as will be discussed later.

The embodiments can consult with the security model, which can be asked to provide information for other contextual items to search. As an example, the embodiments can ask a domain controller to provide all of the usernames it manages. The embodiments can also communicate directly with the security model to obtain other private information. Based on the context 440 that is associated with the exposed credential 430, the analysis service 405 identifies a resource 450 that is associated with at least one of the artifact 425 or the exposed credential 430. For instance, the context 440 might identify a machine, service, application, path, URL, website, database, file, person, or some other identifying information associated with the exposed credential 430.

In some implementations, the analysis service 405 reviews the exposed credential 430 to confirm that it actually is a credential that could be used to access the resource 450. Determining whether the exposed credential 430 can actually be used to access the resource 450 can be referred to as determining the liveness 450A of the exposed credential 430. To be clear, the liveness 450A refers to the exposed credential's ability to actually access the resource 450. If the credential can be used to access the resource 450, then the liveness of the credential can be said to be in a "live" state. On the other hand, if the credential cannot be used to access the resource 450 (e.g., it is invalid), then the liveness of the credential can be said to be in a "dead" state.

The process of determining the liveness 450A of the credential can be performed in multiple different ways.

For instance, the analysis service 405 can query the resource 450 to ask the resource 450 if the credential could be used to gain access to the resource 450. The resource 450 may then provide a response based on the query, and the response could be yes or no. In another scenario, the analysis service 405 may actually attempt to use the exposed credential 430 to access the resource 450. If the attempt is successful, then the analysis service 405 will know that the credential is valid.

In yet another scenario, the analysis service 405 may query a security service model that is associated with the resource 450. For instance, suppose the resource 450 is a SQL database. The SQL database may be managed by a SQL server or service. The analysis service 405 can query this SQL service to determine whether the exposed credential 430 could be used to access the SQL database.

If the analysis service 405 discovers that the exposed credential 430 is representative of a credential but it cannot be used to access any resources, then the analysis service 405 may determine that no harm will come from the exposed credential 430 being left in the data source 420. In such a scenario, the analysis service 405 can refrain from performing any further inquiries to determine the responsible entity. In some scenarios, the analysis service 405 may continue to attempt to identify the responsible entity so that an instructional message can be provided to indicate that perhaps poor techniques were used in allowing the credential to be exposed.

In an alternative scenario, the analysis service 405 may determine that the exposed credential 430, if used, would provide access to the resource 450 and that potential harm could come from the exposed credential 430 being left in the data source 420. In such a scenario, the analysis service 405 can proceed with additional operations in an attempt to identify the responsible entity.

In some scenarios, the embodiments may generate one or more variations of the exposed credential 430 and then test those against the resource 450 to see if those variations can be used to access the resource 450. As an example, suppose the credential is the following password: "Duke2021." The embodiments can generate a variation of this password based on a characteristic or pattern of that password. For instance, in this scenario, the password seemingly appears to include a year. The embodiments can generate a password such as "Duke2022" and then try to use that password to access the resource 450. Machine learning can be implemented to generate the various different variations.

In one implementation, the analysis service 405 can query the resource 450 in an attempt to identify an administrator 455 of that resource 450 (e.g., the responsible entity may be one who manages the resource and that entity may be an administrator of the resource). For instance, the resource 450 may have or can provide access to information identifying a responsible entity for managing the resource. As a result, the resource 450 can, in some instances, provide identifying information to enable the analysis service 405 to identify the responsible entity associated with the resource 450, and that responsible entity will also likely be responsible for the artifact 425 (which the resource 450 is using). This responsible entity is shown as being the administrator 455. The analysis service 405 can then trigger the transmission of an alert 460. Optionally, the alert can be transmitted to the responsible entity (e.g., the administrator). This alert 460 can include information detailing how the exposed credential 430 is in the exposed state. In some cases, the details in the alert can include information describing characteristics of the exposed credential itself, information describing a security model associated with the exposed credential, information as to where the exposed credential was found, who or what found the credential, or even information as to what steps can be performed to invalidate the exposed credential (e.g., steps for remediation). In some cases, the details can include information about the relationship between the credential and the supposed responsible entity. The alert can be sent to the responsible entity, to a security champion, or to some other entity. The alert can also detail the location of the artifact containing the credential as well as steps on how to invalidate the artifact, perhaps.

In some cases, the process of determining the responsible entity (e.g., the administrator 455) that manages the resource can be performed by querying a metadata store associated with the resource 450. This metadata store can include registration information that links the responsible entity to the resource.

In some implementations, determining the responsible entity can be based on utilizing the credential to perform additional discovery by consulting a service using the credential to build out information about the responsible entity. It can also be based on using the credential to communicate directly with a security model to obtain information about the responsible entity. Additionally, or alternatively, it can be based on analyzing telemetry data that is associated with at least one of the artifact, the credential, or the resource.

Some embodiments identify the resource and/or determine the responsible entity based on telemetry data associated with at least one of the artifact, the credential, or the resource. This telemetry data can include usage data, creation data, access data, or any other type of data for those data structures.

Figure 4B:
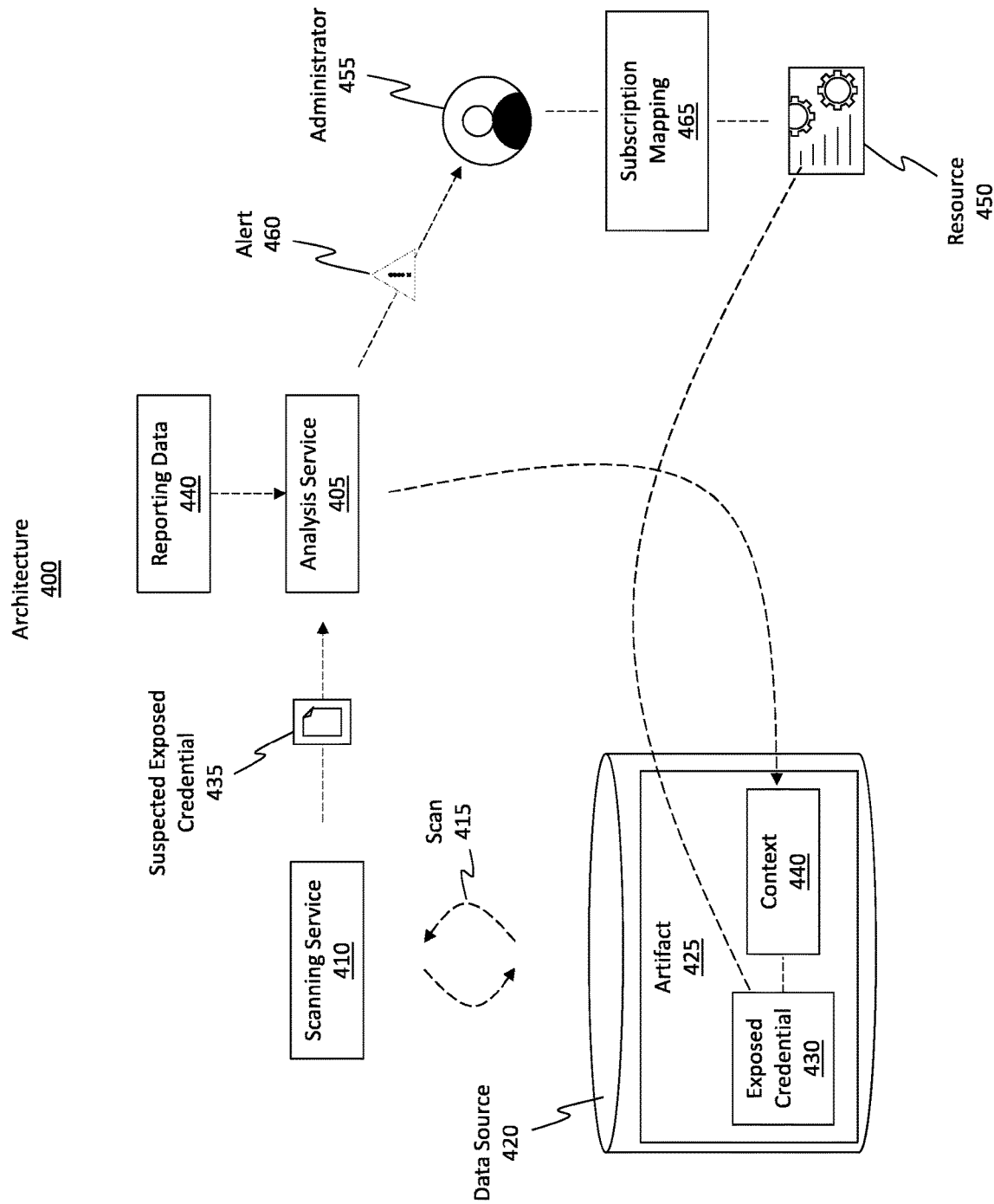

FIG. 4B shows a slight variation. In some instances, the resource 450 may be associated with a particular subscription mapping 465, such as perhaps a billing subscription or perhaps even a notification subscription. Stated differently, it may be the case that the resource is a cloud service operating in a cloud environment, and the subscription mapping is a billing subscription for the cloud service. Among other things, the resource can be a local application, a database administration resource, an on-premise resource, an identity, or even a certificate published by an authority.

In this scenario, the analysis service 405 is able to identify the subscription mapping 465 for the resource 450. The subscription mapping 465 links the resource 450 to a particular entity that is responsible for the subscription and the resource 450. That is, the subscription mapping 465 includes a subscription identification for an entity associated with the resource. The resource 450 can include information or can access information to identify the subscription mapping 465.

As an example, suppose the subscription is a billing subscription. Here, the resource 450 may include a link or other indicator to a subscription mapping that identifies which entity is responsible for the billing aspect related to the resource 450. The analysis service 405 is able to access the subscription mapping 465. The subscription mapping 465 will then identify the administrator 455 associated with the resource 450. Inasmuch as the resource 450 uses or is associated with the artifact 425 and inasmuch as the exposed credential 430 is included in the artifact 425, the analysis service 405 can then infer that the administrator 455 is at least partially responsible for the exposed credential 430, or rather, it would be beneficial to notify the administrator 455 about the exposed credential 430 and the potential for a security breach.

In some implementations the resource 450 may be associated with a secret manager or a credential vault. The credential vault may be tasked with managing the keys, secrets, or credentials for the resource 450. It may be the case that the credential vault also includes information detailing who might be the responsible entity for the resource 450. As a result, the analysis service 405 can optionally query the credential vault in an attempt to identify the administrator 455.

In some implementations, the resource 450 may be associated with a security service model. The security service model may be a focused model directed to manage security operations for resources under its purview, including perhaps the resource 450.

As an example, suppose the resource 450 was a SQL database. The security service model might be SQL server or service specifically tasked with managing security operations for the SQL database. In such a scenario, the analysis service 405 can attempt to identify the security service model. Having identified this model, the analysis service 405 can then query the model in an attempt to identify which entity is responsible for the resource 450. That identified entity can then be notified regarding the exposed credential 430.

Figure 4C:
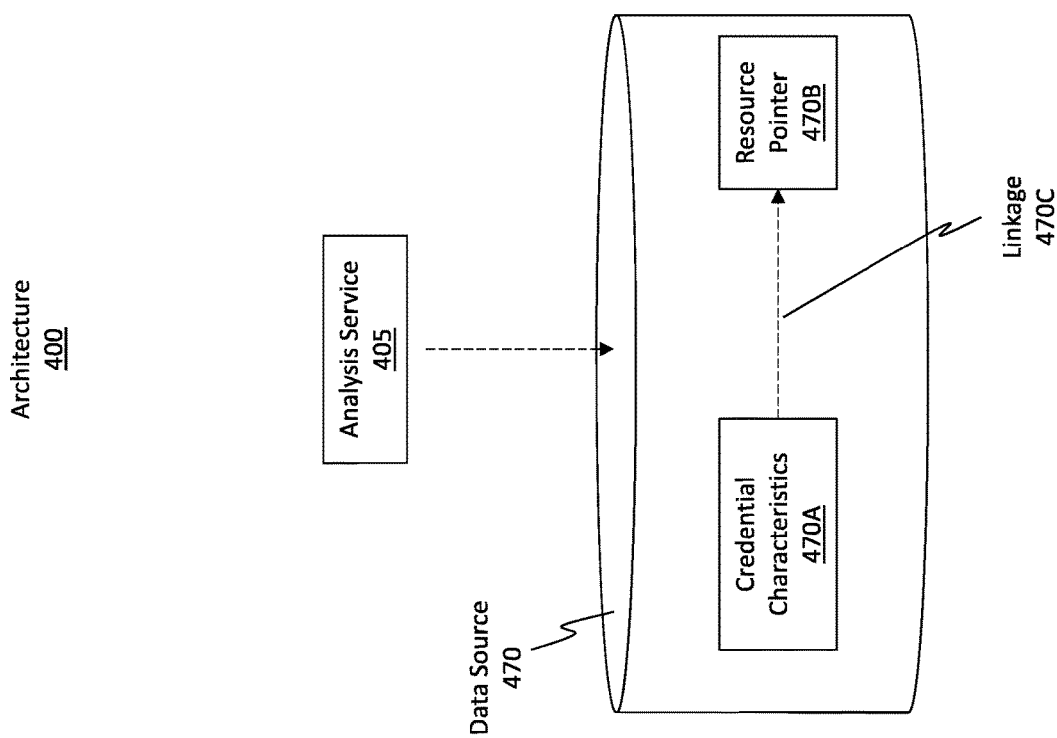

After the responsible entity is identified, some embodiments maintain a log of that information so that subsequent searches can query that log in an attempt to reduce the number of steps for the inquisition process. FIG. 4C is illustrative.

FIG. 4C shows how the analysis service 405 can maintain a data source 470. This data source 470 is shown as including various credential characteristics 470A associated with the exposed credential 430. These characteristics can be of any type. Such characteristics can include, but are not limited to, the time of creation for the credential, the storage location of the credential, the credential type, the data structure of the credential, the signature or checksum characteristics of the credential, the length of the credential, the pattern of the credential, or even the date when the credential was checked into the data source 420. Other characteristics can also be stored in the data source 470.

The data source 470 is also shown as including an indicator (e.g., resource pointer 470B) for the resource 450, where this indicator points to or identifies the resource 450 that is determined to be associated with the exposed credential 430. That is, the data source 470 might not store the actual resource itself, but rather, the data source 470 might store identification information for the resource so that the resource can be linked to the credential characteristics 470A. The resource point 470B represents identification information for the resource.

The data source 470 also includes a linkage 470C or shows a relationship between the credential characteristics 470A and the resource pointer 470B. In this manner, various credential characteristics can be linked to specific resources. Beneficially, the contents of this data source 470 are searchable.

The next time an exposed credential is detected, the analysis service 405 can determine various attributes/characteristics of that credential. The analysis service 405 can then use those attributes as query parameters to search within the data source 470 in an attempt to find another credential that was previously detected and that has similar characteristics. The characteristics need not be exactly the same; instead, a similarity level between the characteristics of the previously detected credential and the new credential may be determined to meet or exceed a similarity threshold. If that threshold is satisfied, then the analysis service 405 can infer that perhaps the resource that was associated with the previously detected credential is the same resource for the new credential, and perhaps the same responsible entities for the previously detected credential are the same responsible entities for this current credential.

As a result, the analysis service 405 can trigger an alert to those same entities to inform them regarding this new credential. Accordingly, some embodiments employ an enriched data source 470 that includes the results of previous inquiries and relationships. One will appreciate how the use of this data source 470 can significantly improve the searching process in that this data source 470 perpetually builds a corpus of relationships and knowledge that can be leveraged for future searches. This process can be viewed as being a type of feedback loop that continuously builds a knowledge bank. This knowledge bank is searchable and can be used to help facilitate subsequent inquiries.

Figure 4D:
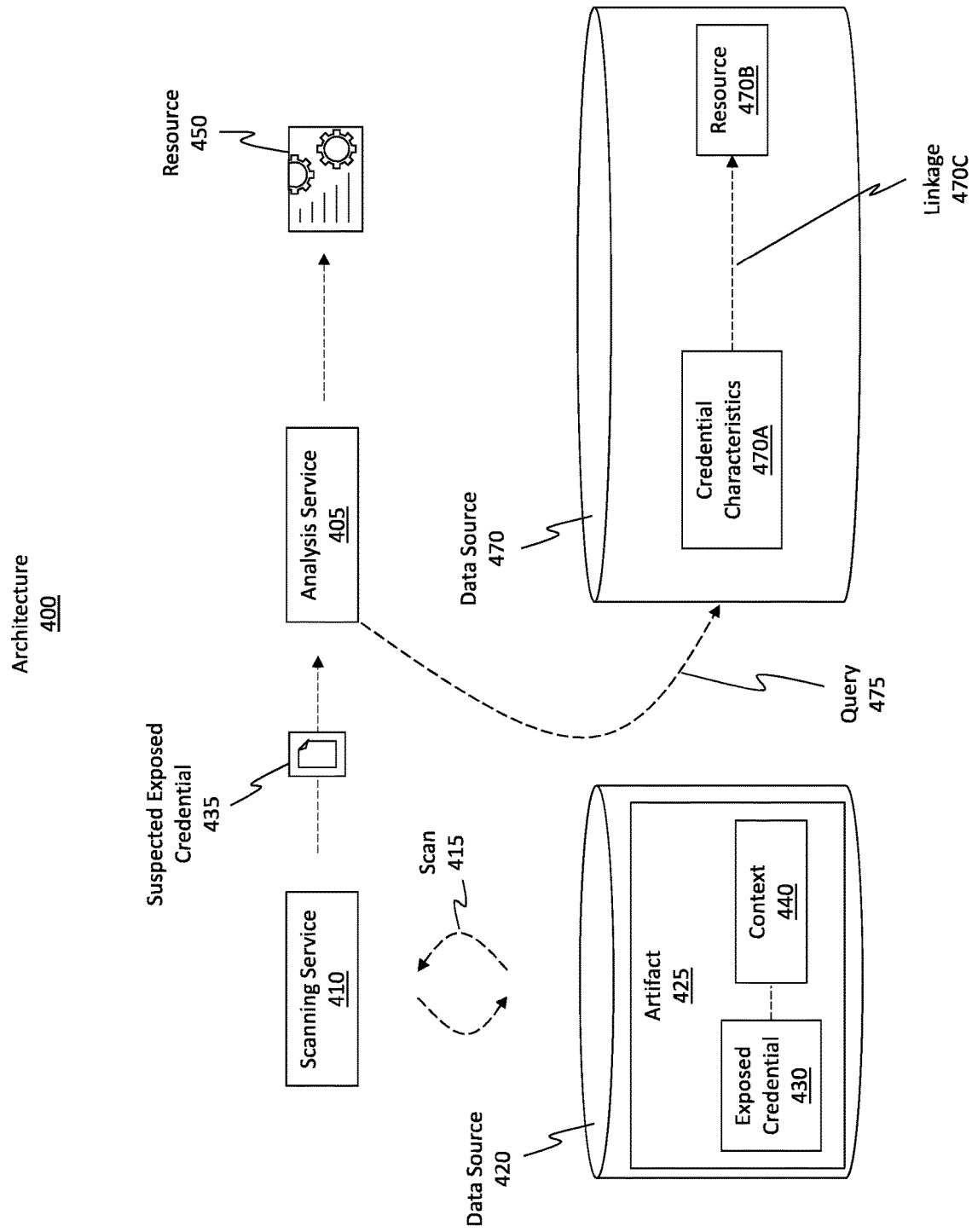

FIG. 4D shows a scenario where the analysis service 405 can obtain characteristics about the exposed credential 430 as well as the context. The analysis service can then use this information as parameters in a query 475 to scan the data source in an attempt to find other credentials that have similar characteristics. To be clear, the search parameters can include characteristics about the exposed credential as well as the context 440. By way of further clarification, the credential characteristics 470A can include internal characteristics of an exposed credential as well as that credential's context.

If a sufficiently similar credential is found in the data source (e.g., one whose similarity meets or exceeds the similarity threshold based on the characteristics), then the analysis service 405 can identify the resource. The analysis service 405 can then trigger the transmission of the alert to this resource.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5A:
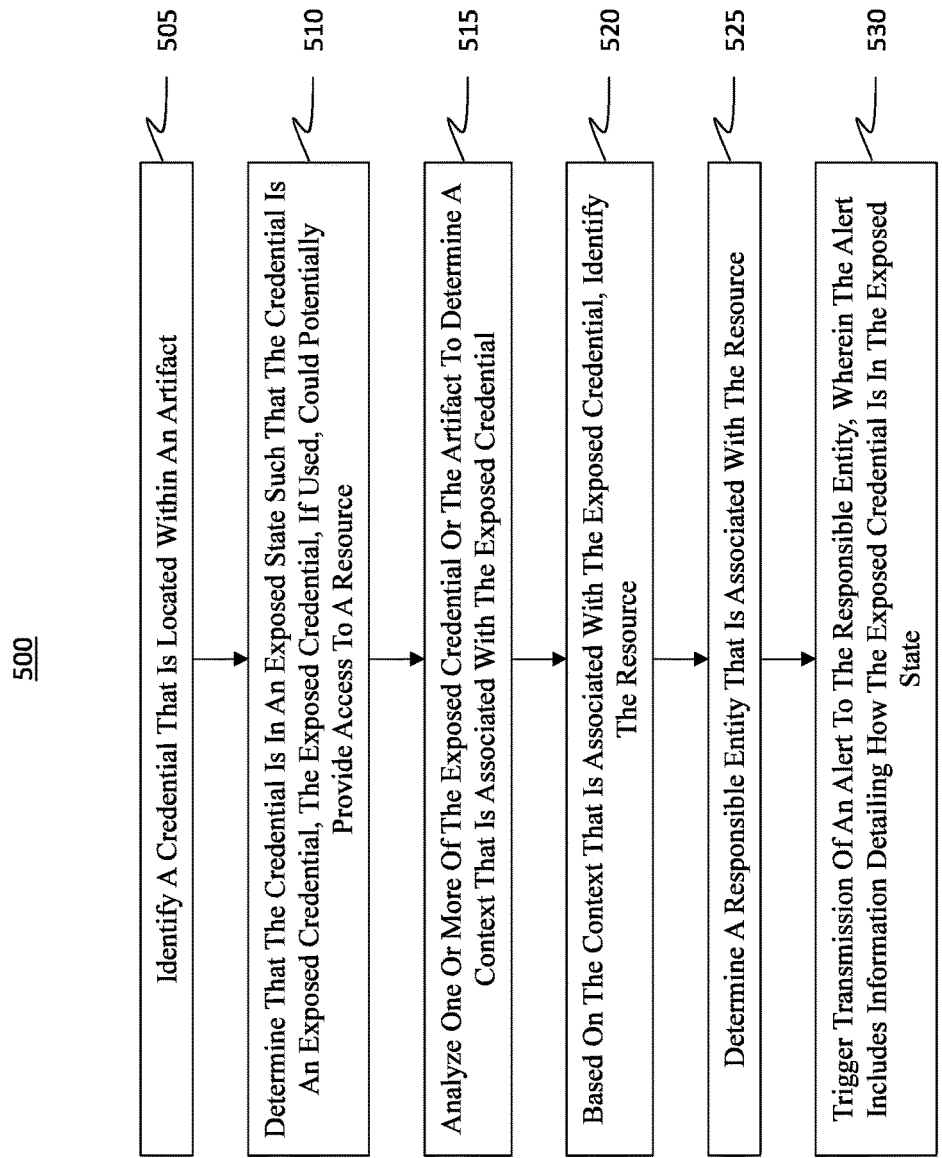
FIGS. 5A, 5B, and 5C illustrate various flowcharts of example methods for determining a responsible entity of an exposed credential.

Attention will now be directed to FIG. 5A, which illustrates a flowchart of an example method 500 for (i) using contextual information associated with an exposed credential to identify a resource that could be accessed using the exposed credential, (ii) identifying a responsible entity of that resource, and (iii) alerting the responsible entity about the exposed credential. Method 500 can be implemented within the architecture 400 of FIGS. 4A through 4D. Furthermore, method 500 can be implemented by the analysis service 405.

Method 500 includes an act (act 505) of identifying a credential that is located within an artifact. This identification process can be performed by scanning a data source to look for data structures that might be a credential. For instance, the scanning service 410 from FIG. 4A can scan the data source 420. The scanning parameters can optionally include a known pattern that credentials have.

Stated differently, the process of identifying the credential that is located within the artifact can include a number of steps. One step involves scanning a data source that includes the artifact. Another step involves identifying a suspected credential that is suspected of being the exposed credential, which, if used, could potentially provide an unauthorized entity access to the resource. Yet another step includes determining a characteristic of the suspected credential. Optionally, this characteristic comprises a detected pattern associated with the suspected credential. Based on the determined characteristic of the suspected credential, another step includes determining that the suspected credential is the exposed credential.

Additionally, or alternatively, reporting data can be accessed, where the reporting data includes an indication of an exposed credential. In some implementations, the credential is identified as being an authorization credential (i.e. one that provides authorization to a bearer of the credential to access a resource) based on a detected pattern associated with the credential.

Act 510 includes determining that the credential is in an exposed state. As a result, the credential is an "exposed" credential. The exposed credential, if used, could potentially provide an unauthorized entity access to a resource. In some embodiments, determining that the credential is in the exposed state includes determining an access availability of a data source that is storing the credential. If the access availability is below an access threshold with regard to at least one of the credential, the artifact, or perhaps the resource, then the embodiments determine that the credential is in the exposed state. As an example, suppose the artifact and credential are stored in a publicly accessible data source. If the resource is a private resource, then public access should not be permitted. In this case, however, the credential is publicly available. Such a scenario could enable a malicious actor to use the credential to improperly gain access to the resource. Therefore, this example describes a scenario where the access availability of the public data source does not meet (i.e. fails) the access requirements or threshold (e.g., access requirement threshold) established by the resource (e.g., because the resource should not be accessed by anybody in the public).

In an effort to avoid a possible security breach, the embodiments are then tasked with attempting to identify a responsible party or entity associated with the exposed credential. The responsible party might be responsible for the artifact in which the exposed credential is located. Additionally, or alternatively, the responsible party might be responsible for a resource that relies on the artifact or that is otherwise associated with the exposed credential.

Act 515 includes analyzing one or more of the exposed credential or the artifact to determine a context that is associated with the exposed credential. The context can include internal context obtained directly from the exposed credential, such as perhaps metadata associated with the credential, a pattern of the credential, and so forth. The context can include external context obtained indirectly from the exposed credential, such as perhaps details from within the data structure that includes the credential, the storage location of the credential, or even the access, creation, or upload timestamp of the credential. In some cases, the context includes one or more of: metadata associated with the exposed credential or the artifact, an identifying keyword included in the artifact, or a file path associated with at least one of the exposed credential, the artifact, or the resource.

Based on the context that is associated with the exposed credential, act 520 includes identifying the resource. Act 525 then includes determining a responsible entity that manages the resource or that is associated with the resource. Finally, act 530 includes triggering transmission of an alert to the responsible entity. The alert includes information detailing how the exposed credential is in the exposed state.

In some implementations, the method can further include periodically querying to determine whether the exposed credential has been invalidated. In response to a determination that the exposed credential has not been invalidated, the method can include an act of providing an elevated alert or at least a subsequent alert. For instance, this elevated or subsequent alert can be sent to a superior or manager of the identified entity. In some cases, the elevated alert can include alerts being sent to multiple different groups, individuals, or administrators.

In response to a determination that the exposed credential has already been invalidated, the embodiments can finalize actions related to remediation of the exposed credential. For instance, the embodiments can terminate active remediation actions that may be queued or that may be active with regard to the exposed credential. The embodiments can terminate any active investigations related to the exposed credential. The embodiments can also terminate, cancel, or delete alerts. Finalizing the actions can also include engaging in various other activities. For instance, the embodiments can reduce or adjust a severity of the alerts already sent. The embodiments can contribute telemetry or other signal data to a dashboard. The embodiments can report tracking data on unresolved problems and/or otherwise drive to completion ongoing investigations and issue resolutions activities. The embodiments can close open tickets associated with the exposed credential. The embodiments can also send a positive signal to responsible entities to indicate that the exposed credential is invalidated (e.g., remediation is complete).

Optionally, after the resource has been identified, the method can include an act of determining whether the exposed credential can actually provide access to the resource. For instance, the embodiments can attempt to use the credential to access the resource.

In some cases, the exposed credential is a password. In such a scenario, the method can further include determining that the password (in its current form) cannot be used to access the resource. That being said, the embodiments can determine a characteristic of the password, such as that the password has a recognizable pattern. Based on the characteristic of the password (e.g., perhaps its recognizable pattern), the embodiments can generate one or more variations of the password. The embodiments can then attempt to access the resource using the one or more variations of the password. An example will be helpful.

Suppose the detected password was "Egghead1234." The embodiments can attempt to use this password to access the resource. It might be the case that this password is not valid. That being said, however, the embodiments can detect the pattern of this password. Here, it appears as though the password is generated by appending additional numbers at the end, with the next number potentially being a "5." The embodiments can then generate the following password: "Egghead12345" and attempt to use that password to access the resource. In some cases, multiple variations may be generated and tested, such as perhaps "Egghead123456", "Egghead1234567", or perhaps even "Egghead1234A". In some cases, a machine learning algorithm can be applied to the detected password to learn a pattern and to then generate password variations based on that pattern.

The embodiments can attempt to use the password, as well as potentially any derived variations, in different security scenarios as well. For instance, the embodiments can attempt to use the password to access a resource that may be of the same type as the one that is potentially compromised. An example will be helpful. In one scenario, the embodiments can attempt to use the password to access a first email platform. Additionally, the embodiments can attempt to use the same password to access a second email platform. Thus, the embodiments can identify other resources that are of a same resource type, and the embodiments can then attempt to use the password on those other related resources. Accordingly, the embodiments can attempt to access a different resource using the password, where the different resource is of a same type as the original resource. Other data structures can be attempted as well, such as a user's username, account name, alias, and so on.

Figure 5B:
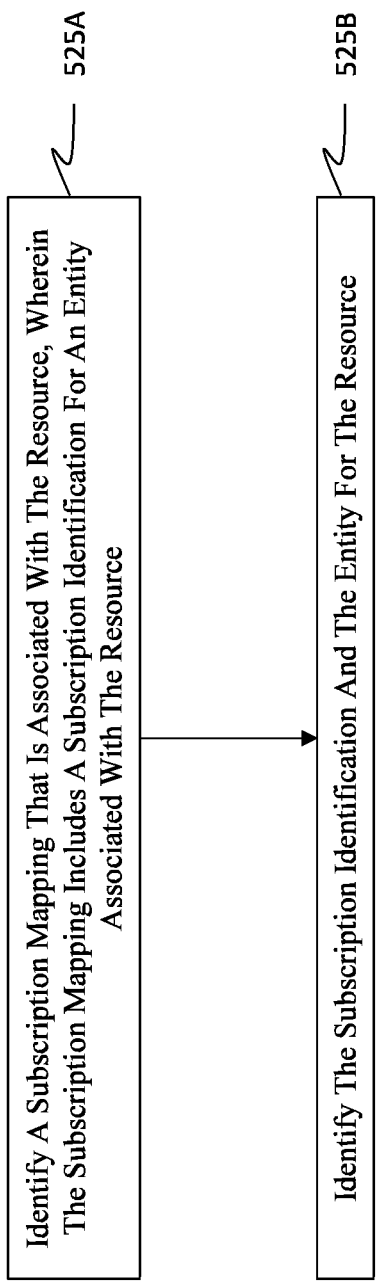

In some cases, act 525 can include a number of sub-steps, as shown in FIG. 5B. For instance, the method can include an act (act 525A) of identifying a subscription mapping that is associated with the resource. The subscription mapping can include a subscription identification for an entity associated with the resource.

Act 525B then includes identifying, based on the subscription identification, the entity for the resource. In this scenario, the embodiments consult the subscription information in an effort to identify the responsible entity.

Figure 5C:
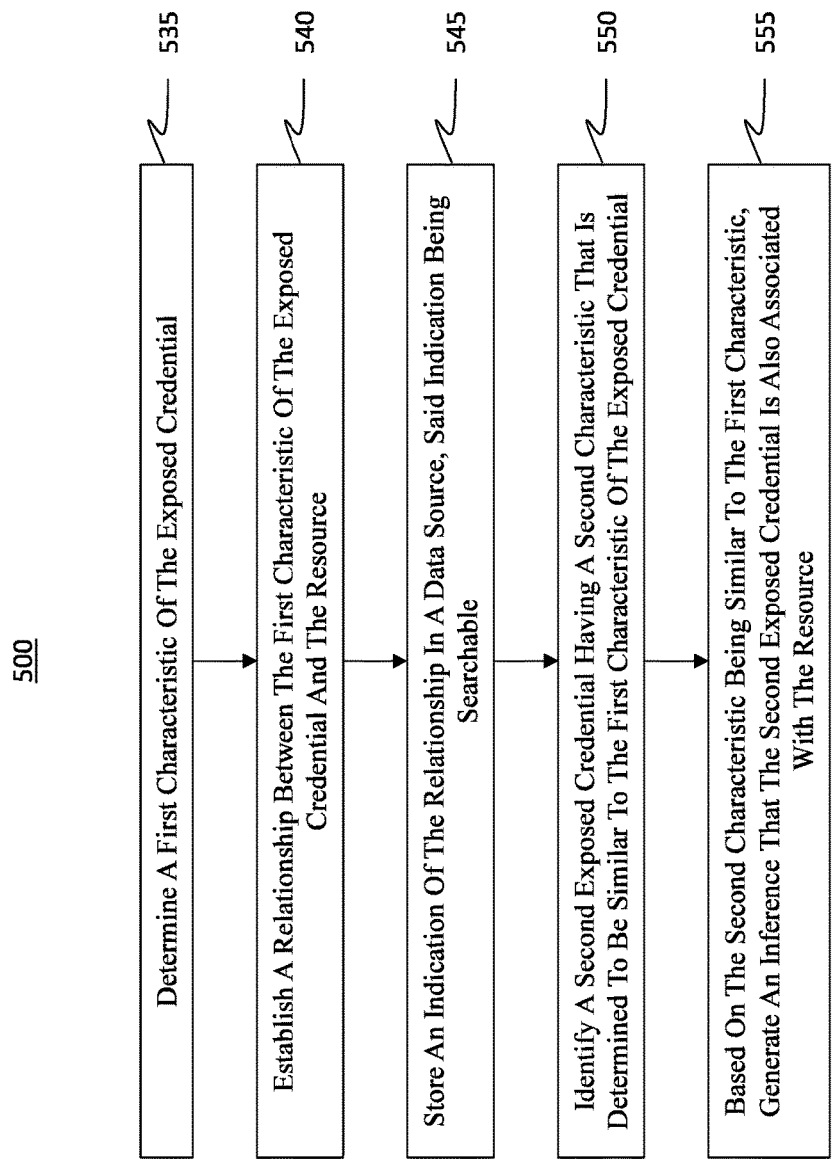

In some cases, the method 500 can include additional acts, as shown in FIG. 5C. For instance, act 535 includes determining a first characteristic of the exposed credential. As an example, this first characteristic can include the creation, upload, or access timestamp of the credential, the storage location of the credential, the author of the credential, the artifact and its characteristics, and so on. Indeed, any type of characteristics can be identified.

Act 540 includes establishing a relationship between the first characteristic of the exposed credential and the resource. Additionally, a relationship between the exposed credential and the entity that was identified earlier is also established.

Act 545 includes storing an indication of these relationships in a data source. This data source and this indication are searchable.

Act 550 then includes, at a later point in time, identifying a second exposed credential having a second characteristic. This second characteristic is determined to be similar to the first characteristic. That is, the level of similarity between the two credentials meets or exceeds a predetermined similarity threshold.

Based on the second characteristic being similar to the first characteristic, act 555 includes generating an inference that the second exposed credential is also associated with the same resource. The inference further includes an indication that the same responsible entity is also likely responsible for this second exposed credential. In some implementations, a confidence metric can be generated to provide a level of confidence regarding how likely it is that the same entity is responsible for this second exposed credential. In some cases, the level of confidence may be dependent on the level of similarity between the two credentials. Higher levels of similarity may lead to an increased level of confidence while lower levels of similarity may lead to lower levels of confidence.

Optionally, the method can include an act of testing the second exposed credential to determine whether the second exposed credential is usable to access the resource. This act can be a part of a verification process. If the second exposed credential can be used to access the resource, then the level of confidence that the identified entity is responsible might be increased. The embodiments can trigger the transmission of an alert to the entity to inform the entity regarding this second exposed credential.

Accordingly, the disclosed embodiments are beneficially structured or configured to identify and alert an entity that is determined to be associated with an exposed credential. The embodiments are able to identify this entity even in scenarios where the credential, or perhaps even the artifact housing the credential, do not identify the entity. Beneficially, the embodiments are tailored to performed various different investigative and discovery processes in an attempt to identify this responsible entity. In doing so, the embodiments help to significantly reduce the risk of security breaches for a resource.

Stated differently, the embodiments are able to determine a human who can take remedial actions for compromised credentials. The technology uses characteristics within the credentials to identify the identity of the compromised asset. The embodiments then use the identity to determine the accountable and responsible people who can address the compromise. Afterwards, the embodiments notify those people that the credentials have been compromised and allows them to take remedial actions. The embodiments can also keep checking the compromised asset to remind the accountable and responsible people until they resolve the issue.

Another aspect of the disclosed principles is that the embodiments can determine with complete accuracy whether credentials that have been compromised are still exploitable (i.e. can they be used to access resources). If not, then even if the credentials have been exposed, those credentials are no longer relevant, and there is no need to raise a false positive flag.

Example Computer/Computer Systems

Figure 6:
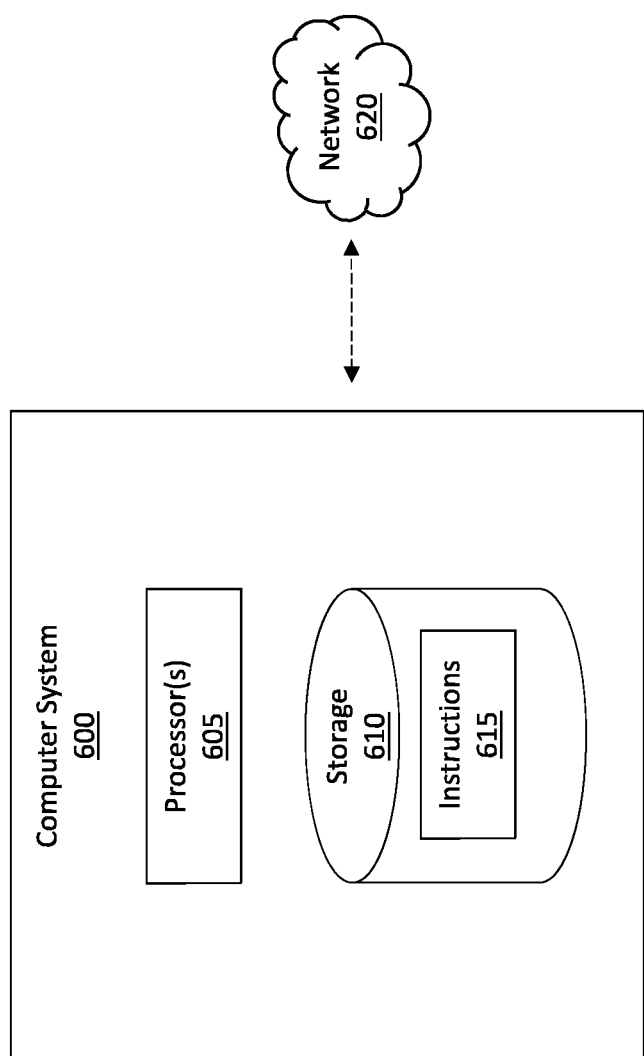
FIG. 6 illustrates an example computer system configured to perform any of the disclosed operations.

Attention will now be directed to FIG. 6 which illustrates an example computer system 600 that may include and/or be used to perform any of the operations described herein. For instance, the computer system 600 can operate within the architecture 400 of FIGS. 4A-4D, and the computer system 600 can implement the analysis service 405. Computer system 600 may take various different forms. For example, computer system 600 may be embodied as a tablet, a desktop, a laptop, a mobile device, or a standalone device, such as those described throughout this disclosure. Computer system 600 may also be a distributed system that includes one or more connected computing components/devices that are in communication with computer system 600.

In its most basic configuration, computer system 600 includes various different components. FIG. 6 shows that computer system 600 includes one or more processor(s) 605 (aka a "hardware processing unit") and storage 610.

Regarding the processor(s) 605, it will be appreciated that the functionality described herein can be performed, at least in part, by one or more hardware logic components (e.g., the processor(s) 605). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 600. The different components, modules, engines, and services described herein may be implemented as objects or processors that execute on computer system 600 (e.g. as separate threads).

Storage 610 may be physical system memory, which may be volatile, non-volatile, or some combination of the two.

The term "memory" may also be used herein to refer to non-volatile mass storage such as physical storage media. If computer system 600 is distributed, the processing, memory, and/or storage capability may be distributed as well.

Storage 610 is shown as including executable instructions 615. The executable instructions 615 represent instructions that are executable by the processor(s) 605 of computer system 600 to perform the disclosed operations, such as those described in the various methods.

The disclosed embodiments may comprise or utilize a special-purpose or general-purpose computer including computer hardware, such as, for example, one or more processors (such as processor(s) 605) and system memory (such as storage 610), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 600 may also be connected (via a wired or wireless connection) to external sensors (e.g., one or more remote cameras) or devices via a network 620. For example, computer system 600 can communicate with any number devices or cloud services to obtain or process data. In some cases, network 620 may itself be a cloud network. Furthermore, computer system 600 may also be connected through one or more wired or wireless networks to remote/separate computer systems(s) that are configured to perform any of the processing described with regard to computer system 600.

A "network," like network 620, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 600 will include one or more communication channels that are used to communicate with the network 620. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for (i) using contextual information associated with an exposed credential to identify a resource that could be accessed using the exposed credential, (ii) identifying a responsible entity of that resource, and (iii) alerting the responsible entity about the exposed credential, said method comprising:
    identifying a credential that is located within an artifact;
    determining that the credential is in an exposed state such that the credential is an exposed credential, wherein the exposed credential, if used, could potentially provide access to a resource;
    analyzing one or more of the exposed credential or the artifact to determine a context that is associated with the exposed credential;
    based on the context that is associated with the exposed credential, identifying the resource;
    determining a responsible entity that is associated with the resource;
    triggering transmission of an alert, wherein the alert includes information corresponding to the exposed credential;
    periodically querying to determine whether the exposed credential has been invalidated;
    in response to a determination that the exposed credential has not been invalidated, providing a subsequent alert; and
    in response to a determination that the exposed credential has already been invalidated, finalizing actions related to remediation of the exposed credential.

2. The method of claim 1, wherein the information corresponding to the exposed credential includes one or more of: information describing characteristics of the exposed credential, information describing a security model associated with the exposed credential, information as to where the exposed credential was found, or information as to what steps can be performed to invalidate the exposed credential.

3. The method of claim 1, wherein the artifact is at least one of: a source controlled artifact, a work ticket, an automation artifact, a workflow artifact, an email, or a document.

4. The method of claim 1, wherein the exposed credential is at least one of: a bearer token, an identity, a certificate, a private key, a static credential store, a container of artifacts, compressed data, or a password.

5. The method of claim 1, wherein the credential is identified based on a detected pattern associated with the credential.

6. The method of claim 1, wherein determining that the credential is in the exposed state includes determining an access availability of a data source that is storing the credential.

7. The method of claim 1, wherein the context is determined via a discovery process that involves one or more of: examining the artifact, examining a nested set of artifacts that include the artifact, or consultation with a security model.

8. The method of claim 1, wherein the resource is at least one of: a local application, a cloud service operating in a cloud environment, a database administration resource, an on-premise resource, an identity, or a certificate.

9. The method of claim 1, wherein the responsible entity is one or more entities with permissions for managing the resource.

10. The method of claim 1, wherein identifying the credential that is located within the artifact includes:
    scanning a data source that includes the artifact;
    identifying a suspected credential that is suspected of being the exposed credential, which, if used, could provide access to the resource;
    determining a characteristic of the suspected credential, said characteristic comprising a detected pattern associated with the suspected credential; and
    based on the determined characteristic of the suspected credential, determining that the suspected credential is the exposed credential.

11. The method of claim 1, wherein the method further includes:
after the resource has been identified, determining whether the exposed credential can actually provide access to the resource.

12. The method of claim 1, wherein the exposed credential is a password, and wherein the method further includes:
determining that the password cannot be used to access the resource;
determining a characteristic of the password;
based on the determined characteristic, generating one or more variations of the password;
attempting to access the resource using the one or more variations of the password; and
attempting to access a different resource using the password, where the different resource is of a same type as said resource.

13. The method of claim 1, wherein determining the responsible entity is based on at least one of:
querying a metadata store associated with the resource, the metadata store comprising registration information that links the responsible entity to the resource,
utilizing the credential to perform additional discovery by consulting a service using the credential to build out information about the responsible entity,
using the credential to communicate directly with a security model to obtain information about the responsible entity, or
analyzing telemetry data that is associated with at least one of the artifact, the credential, or the resource.

14. The method of claim 1, wherein the exposed credential is included in a nested set of artifacts.

15. A method for (i) using contextual information associated with an exposed credential to identify a resource that could be accessed using the exposed credential, (ii) identifying a responsible entity of that resource, and (iii) alerting the responsible entity about the exposed credential, said method comprising:
identifying a credential that is located within an artifact;
determining that the credential is in an exposed state such that the credential is an exposed credential, wherein the exposed credential, if used, could potentially provide access to a resource;
analyzing one or more of the exposed credential or the artifact to determine a context that is associated with the exposed credential, wherein the context includes historical information associated with the exposed credential, the historical information including a duration that the exposed credential has been in the exposed state;
based on the context that is associated with the exposed credential, identifying the resource;
identifying a subscription mapping that is associated with the resource, wherein the subscription mapping includes a subscription identification for an entity associated with the resource;
identifying the subscription identification and the entity for the resource; and
triggering transmission of an alert to the entity, wherein the alert includes information detailing the exposed credential.

16. The method of claim 15, wherein the resource is a cloud service operating in a cloud environment, and wherein the subscription mapping is a billing subscription for the cloud service.

17. A method for (i) using contextual information associated with an exposed credential to identify a resource that could be accessed using the exposed credential, (ii) identifying a responsible entity of that resource, and (iii) alerting the responsible entity about the exposed credential, said method comprising:
identifying a first credential that is located within a first artifact;
determining that the first credential is in an exposed state such that the first credential is a first exposed credential, wherein the first exposed credential, if used, could potentially provide access to a resource;
analyzing one or more of the first exposed credential or the first artifact to determine a context that is associated with the first exposed credential;
based on the context that is associated with the first exposed credential, identifying the resource;
determining a responsible entity that is associated with the resource;
triggering transmission of an alert to the responsible entity, wherein the alert includes information detailing how the first exposed credential is in the exposed state;
determining a first characteristic of the first exposed credential;
identifying a relationship between the first characteristic of the first exposed credential and the resource;
storing an indication of the relationship in a data source, said indication being searchable;
identifying a second exposed credential having a second characteristic that is determined to be similar to the first characteristic of the first exposed credential;
based on the second characteristic being similar to the first characteristic, generating an inference that the second exposed credential is also associated with the resource; and
testing the second exposed credential to determine whether the second exposed credential is usable to access the resource.

* * * * *